Figure 1:
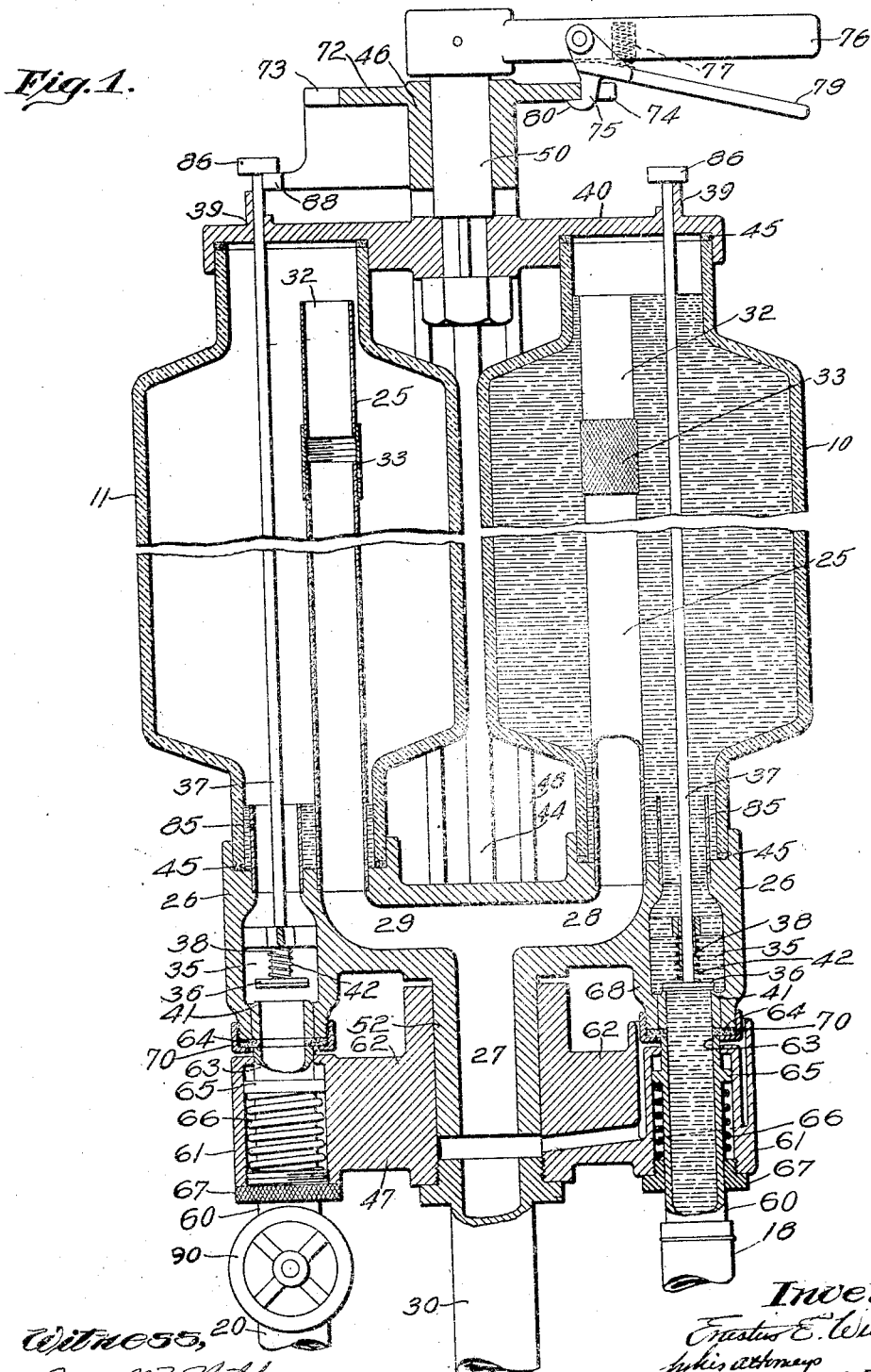

E. E. WINKLEY.
LIQUID MEASURING APPARATUS.
APPLICATION FILED DEC. 16, 1916.

1,330,994.

Patented Feb. 17, 1920.
2 SHEETS—SHEET 1.

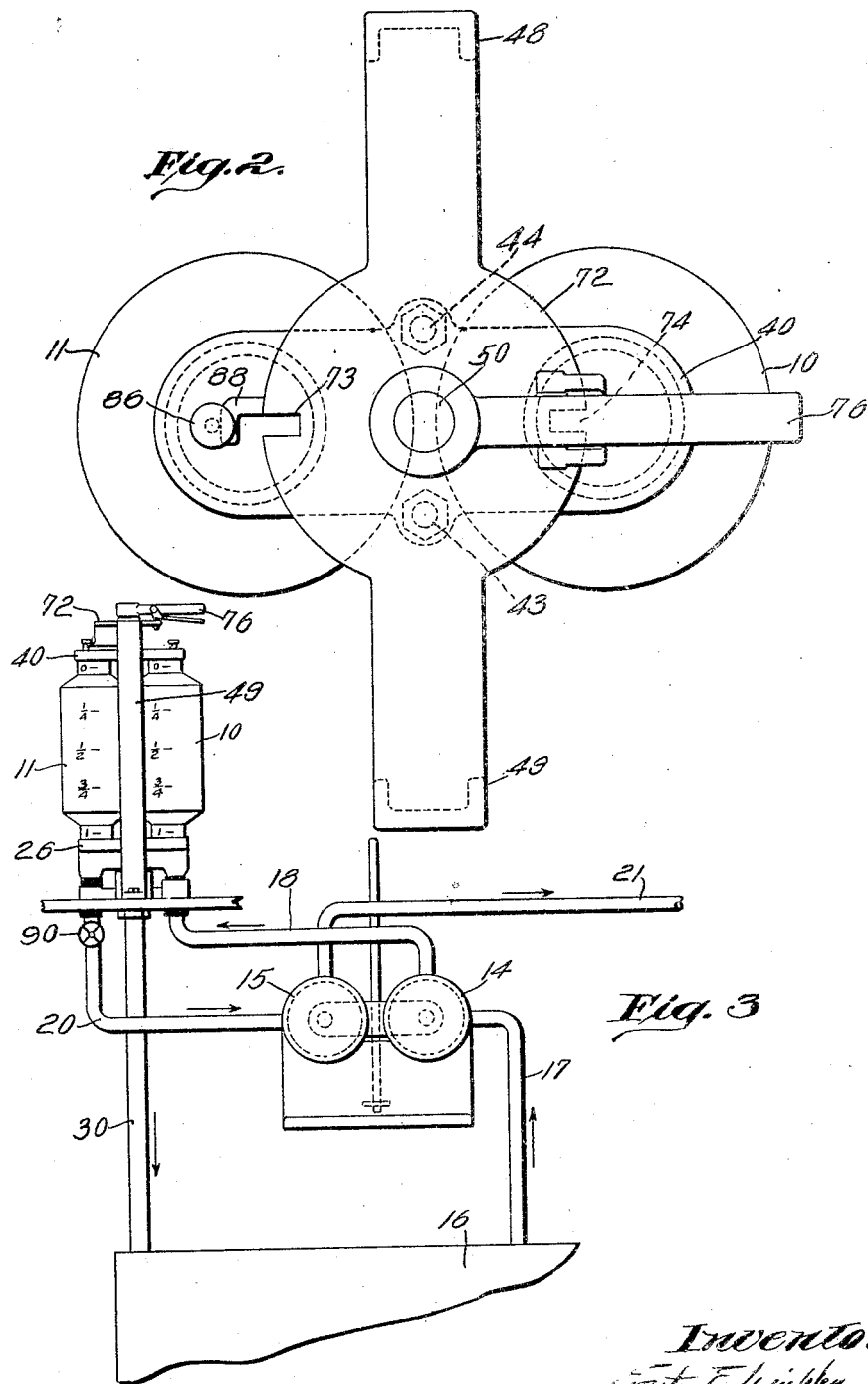

UNITED STATES PATENT OFFICE.

ERASTUS E. WINKLEY, OF LYNN, MASSACHUSETTS.

LIQUID-MEASURING APPARATUS.

1,330,994.

Specification of Letters Patent.　Patented Feb. 17, 1920.

Application filed December 16, 1916. Serial No. 137,366.

*To all whom it may concern:*

Be it known that I, ERASTUS E. WINKLEY, a citizen of the United States, residing at Lynn, in the county of Essex and State of Massachusetts, have invented certain new and useful Improvements in Liquid-Measuring Apparatus; and I do hereby declare the following to be a full, clear, and exact description of the invention, such as will enable others skilled in the art to which it appertains to make and use the same.

The present invention relates to liquid measuring apparatus and more particularly to apparatus of this character employed for measuring gasolene or other combustible fluid.

It is desirable in connection with the dispensing of gasolene and other liquids of this character that apparatus be provided for accurately measuring predetermined volumes of liquid and delivering this liquid as desired.

It is the object of the present invention to provide an improved form of liquid measuring apparatus which is simple and compact in construction and which operates with certainty and rapidity to measure predetermined volumes of liquid.

With this object in view the several features of the invention consist in certain novel features of construction, combinations and arrangements of parts hereinafter described and claimed, the advantages of which will be obvious to those skilled in the art from the following description.

In the accompanying drawings illustrating the preferred form of the invention, Figure 1 represents a longitudinal section in elevation of the improved measuring apparatus; Fig. 2 is a top plan view of the apparatus shown in Fig. 1; and Fig. 3 is a diagrammatic view illustrating the apparatus employed in connection with a pump of the usual type.

According to the present invention the liquid is measured by filling a receptacle of predetermined capacity and then emptying the receptacle, causing a predetermined volume of liquid to be delivered. In the illustrated embodiment of the invention two receptacles of equal capacity are employed and during the time that one receptacle is being filled, the second receptacle is being emptied. Referring to Fig. 3 of the drawings, a pair of liquid receptacles 10 and 11 of equal capacity are provided and are connected, respectively, with the cylinders 14 and 15 of any usual type of double acting liquid pump. With the receptacles positioned as shown in the drawings, liquid drawn from a tank 16 through an intake pipe 17 is delivered to the receptacle 10 through an inlet pipe 18 to fill the receptacle 10. The receptacle 11, which has previously been filled, is emptied through a discharge pipe 20 connected with the cylinder 15 of the pump which delivers the liquid at any desired point through a pipe 21.

In order to provide an extremely accurate measurement of the liquid delivered to each receptacle, means are provided for automatically controlling the height of the liquid in the receptacle, thereby governing the volume of liquid contained in the receptacle. To this end each of the receptacles 10 and 11 is provided with a standpipe 25, extending vertically therethrough and having an upper open end, as shown clearly in Fig. 1 of the drawings, into which the liquid overflows when a predetermined level is reached. Both of the standpipes are secured at their lower ends in a base 26, provided with a central passage 27 and diverging passages 28 and 29, connected with the lower ends of the standpipes 25. The passage 27 is connected directly to the liquid tank 16 through a pipe 30 in order to permit the liquid which has overflowed to be returned to the tank.

In order to compensate for inaccuracies in the size and shape of the receptacles, means are provided for varying the height of the liquid therein. To this end, each of the standpipes 25 is provided with an upper section 32, adjustably secured to the lower section of the standpipe by a threaded sleeve 33. With this construction, the height of the standpipe may be varied as desired, varying the height of the liquid level accordingly and compensating for inaccuracies in the liquid receptacle.

In order to permit the delivery of liquid to each receptacle and to prevent the leakage of liquid therefrom after the receptacle has been filled, a check valve is located in operative relation to the lower end of the receptacle. In the illustrated embodiment of the invention the base 26 is shown as provided with a liquid chamber 35, normally closed by a disk valve 36, secured to the lower end of a stem 37. The stem 37 is guided at its lower end by a bearing 38, secured in the chamber 35 and at the upper end in a bearing 39, mounted upon a head 40. The disk valve is normally maintained in engagement with the valve seat 41 through a spring 42, interposed between the bearing 38 and the disk valve 36.

In order to simplify the operation of the measuring apparatus, it is desirable that the liquid receptacles be connected alternately with the two pump cylinders to cause each receptacle to be successively filled and emptied. To this end mechanism is conveniently provided for shifting the receptacles to first cause the receptacle 10 to be connected with the cylinder 14 and the receptacle 11 with the cylinder 15 and to next cause the receptacle 10 to be connected with the cylinder 15 and the receptacle 11 to be connected with the cylinder 14. As shown clearly in the drawings, the two receptacles are supported at opposite ends by heads 26 and 40, which are connected together by tie rods 44 and 43. The receptacles are preferably made of glass or other transparent material in order that the consumer may observe that the liquid is properly measured, and are clamped firmly between the heads, elastic packing members 45 serving to prevent breakage of the receptacles. The heads are journaled in upper and lower bearing members 46 and 47, respectively, which are connected together by arms 48 and 49, as shown clearly in Figs. 2 and 3 of the drawings. The head 40 is provided with a centrally disposed vertical stud 50, journaled in the bearing member 46 and the head or base 26 is provided with a corresponding stud 52, having the overflow passage 27 formed therein, as previously described.

It will be observed from the above description that with this construction either of the receptacles may be placed in communication with the inlet pipe 18 or the discharge pipe 20. It is essential that means be provided for maintaining a liquid-tight connection between the delivery and discharge pipes and the corresponding receptacle and at the same time permit the shifting of the receptacles from one position to another. To this end each of the pipes, that is the inlet pipe 18 and the discharge pipe 20, is secured to a connector pipe 60, slidingly supported in a bearing 61, formed upon the outer end of an arm 62, extending laterally from the bearing member 47. The upper end 63 of each connector pipe 60 coöperates with a packing ring 64 to form a liquid-tight connection between the lower end of the corresponding receptacle and the delivery or discharge pipe. The connector pipe 60 is provided with an annular flange 65 which is engaged by a compression spring 66, normally tending to elevate the pipe and cause the end 63 of the pipe to engage with the packing ring 64. The spring 66 is interposed in the space between the connector pipe 60 and the bearing 61 and is retained in place by a threaded member 67. The packing ring 64 is secured by a flanged member 70 to the lower end of the boss 68 containing the liquid chamber 35. This construction forms a direct passage for the flow of liquid when the receptacle is seated in position over the inlet or discharge pipe. The pipes 18 and 20 are made flexible to permit the necessary movements of the connector pipes 60 under the action of the spring 66. Suitable mechanism is provided for locking the receptacles in the proper relation to the delivery and discharge pipes and for aiding in the maintenance of a liquid-tight joint between the receptacles and the pipes. To this end the upper bearing 46 is provided with a flange 72 having a pair of oppositely disposed slots 73 and 74, adapted to be engaged by a latch 75, pivoted upon an arm 76. The arm 76 is secured to the upper end of the stud 50 and extends laterally therefrom to cause the arm to move with the heads 26 and 40 when the latter are rotated. The latch 75 is normally maintained in the position shown in Fig. 1 of the drawings by a spring 77 and may be disengaged from the slot 74 by an operating finger 79. It will be noted from an inspection of the drawings that the lower end of the latch has an inturned end 80 which projects beneath the flange 72 when the latch is in operative position. In order to shift the receptacles, the latch is first swung back until the inturned end 80 is disengaged from beneath the flange and the heads and receptacles carried thereby are then elevated by sliding the stud 50 in the bearing 46 and the stud 52 in the bearing 47 until the lower end of the latch clears the upper face of the flange 72. The heads and receptacles may then be rotated to shift the receptacles. This moves the latch from engagement with the slot 74 into a position over the slot 73. The heads are then depressed until the inturned end 80 of the latch engages beneath the flange 72, adjacent the slot 73. This construction serves not only to determine the two operative positions of the receptacles with relation to the delivery and discharge pipes, but also serves to lock the receptacles in operative position. Furthermore, the heads and receptacles carried thereby are depressed against the action of the springs 66 and are locked in this depressed position by the inturned end 80 of the latch engaging beneath the flange 72. This forms a liquid-tight connection between the packing members 64 and the end 63 of the pipe 60 and preserves this connection until the latch is again disengaged.

As stated previously, it is desirable in filling one of the receptacles to automatically determine the level of the liquid and in a like manner when emptying the receptacle it is desirable that the liquid level shall not drop below a predetermined point. To this end each of the receptacles is provided in its lower end with a short open ended tube 85, secured in the head 26, as shown clearly in Fig. 1 of the drawings. The open end of the tube is located above the bottom of the receptacle and the space thus formed provides a trap for sediment and other foreign matter. Furthermore, in emptying the receptacle it is essential that some means be provided for automatically opening the check valve 36 in order to permit the discharge of liquid therefrom. To this end each of the stems 37 is provided on its upper end with a disk 86, which is adapted to engage with a rib 88, formed upon the bearing 46 when the corresponding receptacle is in communication with the discharge pipe 20. As shown clearly in Fig. 1 of the drawings, this engagement of the disk 86 with the rib 88 elevates the valve 36 and permits the free flow of liquid from the receptacle through the discharge pipe 20.

It may be that under certain conditions it is not desired to empty the receptacle, and to this end means are provided for stopping the flow of liquid from the receptacle which is being emptied without necessitating that the delivery of liquid to the opposite receptacle be stopped. A valve, indicated at 90, is conveniently located in the discharge pipe below the apparatus and may be manipulated, when so desired, to stop the flow of liquid through the discharge pipe even though the operation of the pump is continued to deliver liquid to the other receptacle through the delivery pipe 18.

It will be noted from the above description that this apparatus is simple and compact and provides for the accurate measurement of liquids. Furthermore, it is especially adapted to the measurement of gasolene or other volatile fluids as the apparatus is completely closed and no opportunity is presented for the escape of fumes. In this connection it will be observed that during the filling of a receptacle the air is permitted to flow out through the overflow pipe 25 into the fuel tank and in a like manner during the emptying of a receptacle the air is permitted to flow in from the fuel tank through the overflow pipe. Furthermore it will be observed that the area of the overflow passage 27 is considerably larger than the area of either the overflow pipe or the passages 28 or 29, thus permitting a flow of air through the passage 27 into the receptacle which is being emptied although liquid may be passing down through the passage at the same time from the overflow pipe of the receptacle which is being filled.

While it is preferred to employ the specific construction and arrangement of parts shown and described, it will be understood that this construction and arrangement is not essential except so far as specified in the claims, and may be changed or modified without departing from the broader features of the invention.

The invention having been described, what is claimed is:

1. A liquid measuring apparatus having, in combination, a pair of liquid receptacles of equal capacity, a movable head supporting both receptacles, means positioned within each receptacle constructed and arranged to determine the upper and lower levels of liquid within the receptacle, stationary inlet and discharge pipes positioned in operative relation to the receptacles and each adapted to be connected with each of the receptacles, and means for moving the receptacles into operative relation alternately with the inlet and discharge pipes.

2. A liquid measuring apparatus, having in combination, a pair of liquid receptacles of equal capacity, inlet and discharge pipes each adapted to be connected alternately with either one of the receptacles, a check valve located in each receptacle and arranged to permit the delivery of liquid thereto and to normally prevent the withdrawal of liquid therefrom, and means for automatically opening the check valve of a liquid receptacle when connected to the discharge pipe.

3. A liquid measuring apparatus, having in combination, a rotary head, a pair of liquid receptacles supported thereon, liquid inlet and discharge pipes positioned below the receptacles, means for rotating the head to shift the receptacles, and means for locking the head in position with one receptacle connected with the inlet pipe and one receptacle connected with the discharge pipe.

4. A liquid measuring apparatus, having in combination, a rotary head, a pair of liquid receptacles supported thereon, liquid inlet and discharge pipes supported below the receptacles, means for rotating the head to shift the receptacles, and means for locking the head in position with each receptacle connected with one of the liquid pipes and for maintaining a liquid-tight connection between the pipe and the respective receptacle connected thereto.

5. A liquid measuring apparatus, having in combination, a liquid tank, a pair of liquid receptacles positioned above the tank, a standpipe in each receptacle having an open upper end to determine the level of liquid in the receptacle, means for delivering liquid from the tank to either receptacle, an overflow pipe leading into the tank and connections between both standpipes and the overflow pipe to permit the return of the overflow liquid into the tank.

6. A liquid measuring apparatus, having in combination, a rotary head, a liquid receptacle supported thereon, liquid inlet and discharge pipes positioned in operative relation to the head, means for rotating the head to cause the liquid receptacle to be first connected to the delivery pipe and to be next connected to the discharge pipe and means for maintaining a liquid tight joint between the receptacle and the respective pipe with which it is connected.

ERASTUS E. WINKLEY.